July 21, 1959 D. M. GALLARO ET AL 2,896,190

AUDIBLE FLASHING SAFETY TURN SIGNALS FOR VEHICLES

Filed Sept. 17, 1956

INVENTORS
Donald M Gallaro
BY Cloyde B Eatinger 2,896,190
Patented July 21, 1959

2,896,190

AUDIBLE FLASHING SAFETY TURN SIGNALS FOR VEHICLES

Donald M. Galloro, Webster County, and Cloyde B. Eatinger, Fort Dodge, Iowa, assignors, by mesne assignments, to Hoda Corporation, Great Neck, N.Y., a corporation of New York Application September 17, 1956, Serial No. 610,329

6 Claims. (Cl. 340—75)

Our invention has to do with audible tone in connection with flashing turn signals for vehicles and the like, to produce an audible tone corresponding to each light flashing operation of the turn signals.

The object of our invention is to produce an improved safety feature in vehicle turn signals to remind the operator of the vehicle when the turn signals are in operation, and to protect him from the embarrassment of using the turn signals when he does not intend to make the turn.

A further object of the invention is to provide an audible sound of a pleasing nature to permit the operator of the vehicle to know when the signals are in operation without him having to take his eyes off the road to look at the green arrows on the instrument panel to see whether or not they are operating.

Still a further object of our invention is to provide a flasher having a bell tone in connection therewith to remind the operator of the vehicle when the flasher is in operation as well as to remind him when the flasher is not in operation.

Other objects will present themselves, as the specifications are studied.

The need for the invention will be noted when we consider the possibility of making a wrong signal with the system that is presently used on vehicles.

We consider it to be more hazardous to vehicle traffic, when one is driving down the road with a signal indicating that he intends to turn right or left and then does not make the turn, than to have no signal system at all.

The mechanism of the signal system now used on vehicles is made up in such a manner that after rounding a long curve on the highway, the signal lamps are not automatically shut off. Likewise, often when one drives up to a stop light, and let us say, one intends to make a left turn, he turns the left signal on and especially when there isn't any traffic coming from the opposite direction, it is often the usual custom to edge in just a trifle too far toward the left. Then within a few seconds traffic appears from the opposite direction, and one will have to turn back slightly to the right to allow the traffic to pass first. In doing so, the slight right turn of the steering wheel will shut off the turn signal and one is without any signal at all, but wanting to make the left turn.

Again, the lever operating the turn signals is often moved before the vehicle is started and the turn signal is on without the knowledge of the operator of the vehicle.

The position of the lever that operates the turn signals is in such close proximity to the steering wheel that one often slightly touches the lever and turns on a signal without realizing the signal is on, which results in driving with a wrong signal.

To eliminate the possibility of continuous driving with a wrong signal, we have devised a mechanism to enlighten and remind the operator of the vehicle, within a few seconds, when the signals are on or when they are off.

To carry out our invention, we employ the usual front, rear and pilot lights in connection with a flasher wired in the usual manner to various switches and battery, together with a bell tone mechanism secured to or otherwise wired in connection with the flasher to produce an audible tone corresponding to each flash of the lights to enlighten and remind the operator of the vehicle whether or not the signal lights are in operation. When the bell rings, he is conscious the lights are operating and flashing, and when the bell does not ring he is conscious that the signal lights are shut off and not flashing.

The bell tone mechanism comprises a bracket having a relay coil secured thereto and a bell or tone bar in connection with the relay coil and said bracket, the wires of the relay coil being attached to the wiring posts of the flasher or otherwise secured to the flasher to permit the bell to ring with a pulsating or alternating audible sound corresponding with the light flashing when the main switch of the signal circuit is in a closed position to produce a closed electrical circuit.

The drawings illustrate a flasher having three wiring posts as presently used on Chrysler automobiles, and the drawings also show flashers having two wiring posts as presently used on Ford and General Motors automobiles. Whether the flasher has two or three wiring posts is a choice of the manufacturer of the vehicle, since the bell tone mechanism may be easily fashioned to fit either of them.

The simplicity of the bell tone mechanism contributes to the low cost of construction, and said mechanism may be simply connected and installed to the conventional flasher used on the various vehicles merely by connecting the elastic plug of the mechanism to the wiring posts of the flasher, or the mechanism may be wired to the flasher and otherwise secured to the instrument panel of the vehicle.

For a better understanding of the invention, we now refer to the drawings, wherein.

In the drawings, like numerals represent like parts.

Different automobile manufacturers use various types of flasher units comprising a mechanism to make and break the electric circuit to cause a pausing in said circuit to permit a visible flashing of an electric light or lights, as disclosed by numerals 11, 15, 18, and 21, in Figures 1 through 4. The hot leads 14, 17, 19, and 23, are indicated by "X," the light leads 12, 16, 20 and 22 are indicated by "L," and the pilot lead 13 is indicated by "P."

Figure 4:
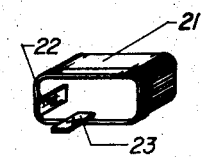
Figure 5:
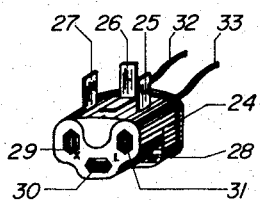
Figure 5 shows a bracket having electrical connections therewith.

A detached plug unit 24, as illustrated in Fig. 5, comprises a bracket having electric connections fitted therewith to adapt the plug unit to the various flasher units through female terminals 29, 30 and 31. Said terminals 29, 30 and 31 emerge from the side of the unit 24 as male terminals 25, 26 and 27. Terminals 29 and 27 are connected with each other and indicated by "X" for the hot lead, terminals 30 and 31 are connected inside the unit, terminals 30 and 26 are connected with each other, and the terminals 31 and 25 are connected with each other, the terminals 30, 31, 25, 26 being indicated by "L" for the light lead. Coil wires 32 and 33 are secured to terminals 29 and 31. Bracket 24 has holes 28 therein to secure the bracket to a sound producing assembly. Thus—it will be noted that the plug unit will cooperate with the terminals of the flasher units as shown in Figures 1, 3 and 4, while, with the flasher unit as shown in Figure 1 using the pilot terminal, it would be necessary to disconnect the connection between terminals 30 and 31 to properly connect the plug unit to the flasher using the three terminals as shown in Figure 3.

Plug unit 24 has insulation 24a on one side thereof and the unit and the insulation are fitted to the bracket member 34 by means of holes 28 receiving studs 50 and 51. Bracket member 34 is angled and terminates in a stop 35 at one end thereof, and the opposite end of the bracket is bent and adapted to receive a sound producing element comprising a bell 46. This bell is adapted to be secured to the bracket member end 36 by a bolt 47 and a nut 48. An electro-magnetic coil 41 includes a central core (not referenced), and the wires of the coil, 32 and 33, are secured to the terminals 29 and 31 of the plug unit 24, one end of the central core being secured to bracket member 34 by a stud 49. A clapper 40 is provided, comprising an armature having an extension (not referenced) at one end thereof and an adjustable member comprising a threaded bolt end 42, with a striker head 45 opposite thereto, said bolt extending through said extension and adjustably secured thereto by nuts 43 and 44. The opposite end of the clapper 40 is operatively fitted to bracket member 34 between the stop 35 and the free end of the central core of the magnetic coil 41, said clapper end receiving one end of a spring 38, as indicated at 30, and the opposite end of the spring 38 being fitted to the bracket member 34 at hole 37 to tension the clapper.

Figure 6:
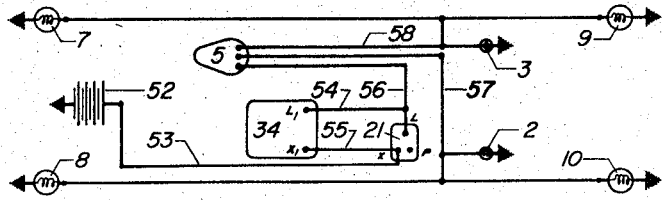
Figure 6 is an illustrative schematic wiring diagram for the device.
Figure 7:
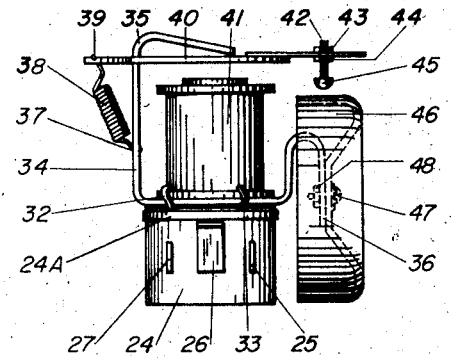
Figure 7 is a side elevation of a sound producing device or mechanism.
Figure 8:
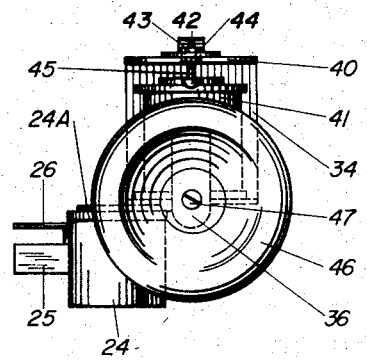
Figure 8 is a view of the arrangement of Fig. 7, as viewed from the right.
Figure 10:
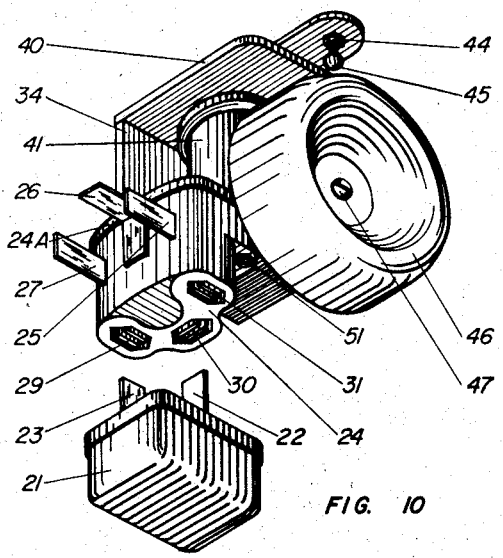
Figure 10 is a perspective view of the arrangement of Fig. 7, including the attachment of the flasher element in Figure 4, in connection therewith.
Figure 9:
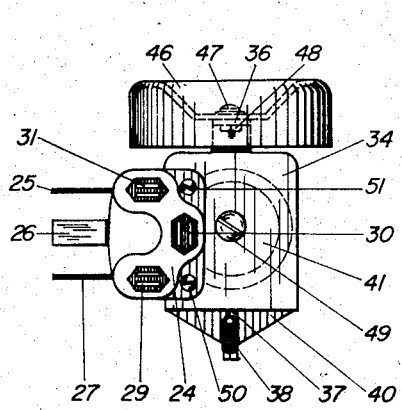
Figure 9 is a bottom plan view of the arrangement of Fig. 7.

A possible wiring diagram for all the flashers, excepting the flasher unit 11, is shown in Figure 6, wherein the battery 52 has a hot lead 53 extending therefrom to the hot terminal of the flasher, a wire 56 extending from the flasher light lead L to the switch 5. Switch 5 is connected through wire 57 to lights 2, 8 and 10 on the circuit on the left side of the vehicle, and through a wire 58 to the lights 3, 7 and 9 on the circuit on the right side of the vehicle. Wires 54 and 55 may be used when it is desired to locate the sound producing mechanism away and remotely from the flasher unit as shown in the diagram.

Figure 1:
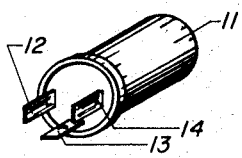
Figures 1, 2, 3 and 4 illustrate various kinds of flasher assemblies, using various positioned terminals thereon.
Figure 2:
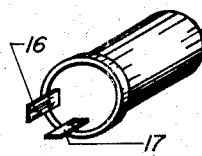
Figure 3:
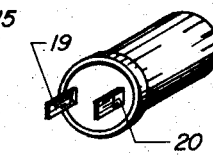

The drawing shows the wiring of the setup usually used for the two terminal flasher units, the bracket 24 securing the sound producing mechanism to the flasher and said bracket being substantially a universal fitting to connect to the various flasher terminals as disclosed in Figures 2, 3 and 4, and to adapt the bracket 24 to fit and operate on the three terminal flasher unit as disclosed in Figure 1, all one would have to do is to have a bracket 24 with the electrical connections therein without the (non referenced) connection between terminals 30 and 31, as before described.

The drawings also disclose a sound producing mechanism as disclosed in Figures 7 through 10 to be fitted to the conventional flasher units as presently used on automobiles—but it will be easily understood that the sound-producing mechanism may as well be built in with the flasher means to build the flasher means and the sound producing mechanism all in one unit without departing from the original intent of the invention, for use by the manufacturers of automobiles built in the future to lower the installation and manufacturing costs of the device.

It will be noted that the audible bell tone is produced by the striker head 45 contacting the bell 46 with each energizing of the coil 41, the clapper 40 constituting an armature. Clapper 40 may as well be a sound or tone producing member to produce an audible sound or tone when said clapper strikes the free end of the unreferenced central core of the electro-magnetic coil 41, and the bell 46 may be eliminated.

The various flasher mechanisms as shown at 11, 15, 18 and 21 all contain a means to produce a pausing make and break contact in the electrical circuit to permit a flashing of the lights visible to the human eye to produce flashing turn signals for vehicles, and the sound producing mechanism as herein disclosed is operatively associated with said means to produce a sound or tone audible to the human ear, and each sound corresponding simultaneously to each individual flash of the lights.

Other flasher means other than the ones herein disclosed may as well be used in connection with the sound producing mechanism to accomplish the result above mentioned.

While we have shown certain specific embodiments of our invention, we reserve the right to make changes without departing from the original intent of the invention, and shall be limited only by the scope of the appended claims.

Having described our invention, we claim:

1. In an automotive vehicle turn signalling system of the type including a flasher having a hot terminal connected to the vehicle electric power supply and a signal lamp terminal connected to a turn signal selector switch operable to selectively connect the flasher lamp terminal to selected signal lamps for selective intermittent energization of the signal lamps, the improvement comprising an electromagnet coil having opposite ends connected to said hot and lamp terminals for intermittent energization of said coil, when said selector switch is operated to signal a turn, in accordance with the intermittent lamp circuit controlling operation of said flasher; an electromagnetic armature operable by said coil; means biasing said armature away from said coil; and an element struck by said armature when the latter is drawn toward said coil each time the latter is energized; whereby said armature strikes said element to produce a single audible sound once during each cycle of operation of said flasher.

2. The improvement defined in claim 1 in which said element is a bell struck by a clapper incorporated with said armature.

3. The improvement defined in claim 1 in which said element is the core of said coil.

4. In an automotive vehicle turn signalling system of the type including a flasher having a male hot terminal engageable in a reciprocable terminal connected to the vehicle electric power supply and a male signal lamp terminal engageable in a receptacle terminal connected to a turn signal selector switch operable to selectively connect the flasher lamp terminal to selected signal lamps for selective intermittent energization of the signal lamps, the improvement comprising an adapter unit including female hot and lamp terminals receiving said male hot and lamp terminals and respectively connected to male hot and lamp terminals respectively engageable in said receptacle terminals; an electromagnet coil having opposite ends connected to said hot and lamp terminals of said adapter for intermittent energization of said coil, when said selector switch is operated to signal a turn in accordance with the intermittent lamp circuit controlling operation of said flasher; a bracket secured to said adapter, said coil being mounted on said bracket; an electromagnetic armature movably mounted on said bracket and operable by said coil; spring means connected to said armature and bracket and biasing said armature away from said coil; and an element on said bracket struck by said armature each time the latter is drawn toward said coil; whereby said armature is intermittently drawn toward said coil as the signal lamps are intermittently energized by said flasher.

5. The improvement defined in claim 4 in which said element is a bell struck by a clapper incorporated with said armature.

6. The improvement defined in claim 4 in which said element is the core of said coil.

References Cited in the file of this patent

UNITED STATES PATENTS

| | | |
|---|---|---|
| 1,208,866 | Weishaar et al. | Dec. 10, 1916 |
| 1,942,811 | Green | Jan. 9, 1934 |
| 2,060,831 | Smith | Nov. 17, 1936 |